(12) United States Patent
Fox et al.

(10) Patent No.: US 10,671,863 B2
(45) Date of Patent: Jun. 2, 2020

(54) METHODS AND SYSTEMS FOR MANAGING VEHICLES TO ENHANCE SAFETY

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); John D. Wilson, League City, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/925,833

(22) Filed: Mar. 20, 2018

(65) Prior Publication Data
US 2019/0294894 A1   Sep. 26, 2019

(51) Int. Cl.
*G06K 9/00*   (2006.01)
*G08B 21/18*   (2006.01)

(52) U.S. Cl.
CPC ......... *G06K 9/00805* (2013.01); *G08B 21/18* (2013.01)

(58) Field of Classification Search
CPC .. H04M 1/6505; H04M 1/72572; H04M 1/56; H04M 1/575; H04M 1/72533; H04M 2250/60; H04M 19/04; H04M 1/0202; H04M 1/236; H04M 1/57; H04M 1/64; H04M 1/72519; H04M 1/72522; H04M 2250/52; H04M 2250/74; H04M 3/42034; H04M 3/533; H04M 11/007; G07C 2009/00769; G07C 9/00007; G07C 9/00309; H04W 4/12; H04W 4/80; H04W 88/02; H04W 4/60; H04W 52/0251; H04W 88/06; H04W 4/021; H04W 4/02; B60N 2/002; B60R 16/033; B60R 25/00; B60R 2325/205; B60R 2325/304; B60R 25/02; B60R 25/042; B60R 25/08; B60R 25/102; B60R 25/33; B60R 2025/0415; B60R 25/04; B60R 25/06; B60R 25/1001; B60R 25/21; B60R 25/23; F02N 11/0862; F02N 2200/061; F02N 477/65; F02N 74/19251; F02N 74/2003; F02N 74/2014; F02N 11/0818; F02N 11/0822; F02N 11/084; G10L 17/00; H02J 7/14; H02J 9/002; H02J 17/00; H02J 50/00; H02J 50/20;
(Continued)

(56) References Cited

U.S. PATENT DOCUMENTS

| 8,146,695 B1* | 4/2012 | Ramshur ................ B62D 1/283 180/168 |
| 2008/0216594 A1* | 9/2008 | Strait .................. F16H 59/0204 74/473.12 |

(Continued)

FOREIGN PATENT DOCUMENTS

| WO | 2017164725 A1 | 9/2017 |
| WO | 2017176689 A1 | 10/2017 |

*Primary Examiner* — Daniel Previl
(74) *Attorney, Agent, or Firm* — Griffiths & Seaton PLLC

(57) ABSTRACT

Embodiments for managing vehicles by one or more processors are described. Deactivation of a vehicle is detected. While the vehicle is deactivated, an event indicative of a safety concern associated with the vehicle is detected. An indication of the event is caused to be provided to a user of the vehicle when the vehicle is reactivated.

18 Claims, 9 Drawing Sheets

(58) Field of Classification Search
CPC .......... H02J 50/90; H02J 7/025; G06Q 20/32; H04B 10/11; H04B 1/1607; H04L 12/2818; Y02D 70/00; Y02D 70/164; Y02D 70/166; Y02D 70/168; Y02D 70/26; B60K 31/00; B60K 26/02; B60K 28/04; B60K 28/12; B60K 31/02; B60K 20/02; B60T 17/221; B60T 7/22; B60T 7/18; B60T 8/4266; B60T 8/4863; B60T 2201/124; B60T 7/042; B60T 7/122; B60W 2050/146; B60W 2550/308; B60W 2720/10; B60W 2750/308; B60W 30/146; B60W 30/16; B60W 10/06; B60W 30/143; B60W 10/184; B60W 10/04; B60W 50/029; B60W 10/10; B60W 2710/105; B60W 10/18; B60W 2520/10; B60W 2540/10; B60W 2540/12; B60W 2710/18; B60W 30/188; B60W 2550/402; B60W 2050/0292; B60W 2520/26; B60W 2550/148; B60W 50/023; B60W 50/10; B60W 10/08; B60W 10/11; B60W 2050/0005; B60W 2050/0006; B60W 2050/0016; B60W 2050/0095; B60W 2050/0096; B60W 2510/06; B60W 2510/18; B60W 2510/186; B60W 2520/105; B60W 2520/28; B60W 2540/04; B60W 2710/06; B60W 2710/0644; B60W 2710/0666; B60W 2710/083; B60W 2710/085; B60W 2710/182; B60W 2720/106; B60W 2720/30; B60W 30/18063; B60W 30/18109; B60W 30/18172; B60W 50/085; B60W 50/14; B60W 2250/20; B60W 30/09; B60W 30/095; B60W 30/0956; B60W 30/18054; B60W 50/087; G06F 3/04817; G06F 3/0484; H04N 1/00411; H04N 21/4312; F02D 41/021; F02D 41/042; F02D 11/105; F02D 11/106; F02D 11/107; F02D 2011/108; F02D 2200/501; F02D 2200/602; F02D 2250/26; F02D 17/04; F16H 61/0213; F16H 2059/023; F16H 2059/506; F16H 2061/0239; F16H 59/0204; F16H 61/16; F16H 2059/0221; F16H 2059/081; F16H 2059/085; F16H 2063/423; F16H 59/08; F16H 59/12; F16H 61/0437; F16H 61/08; F16H 63/42; B60Y 2300/143; F16D 65/0037; Y10T 477/65; Y10T 74/19251; Y10T 74/2003; Y10T 74/2014; G06K 19/0707; H01Q 1/243; H01Q 1/248; Y02T 10/48

USPC .... 340/904, 425.5, 901, 903, 909–910, 925, 340/944, 961, 426.16, 438, 565

See application file for complete search history.

(56) References Cited

U.S. PATENT DOCUMENTS

| | | | |
|---|---|---|---|
| 2009/0027188 A1* | 1/2009 | Saban | B60N 2/002 340/521 |
| 2012/0056734 A1* | 3/2012 | Ikeda | G08G 1/165 340/425.5 |
| 2015/0326038 A1* | 11/2015 | Lee | H01M 10/48 320/134 |
| 2016/0244039 A1* | 8/2016 | Rizzo | B60T 8/322 |
| 2016/0318482 A1* | 11/2016 | Cogill | B60R 25/30 |
| 2018/0039917 A1* | 2/2018 | Buttolo | G01C 21/3438 |
| 2018/0072313 A1* | 3/2018 | Stenneth | B60W 40/04 |

* cited by examiner

METHODS AND SYSTEMS FOR MANAGING VEHICLES TO ENHANCE SAFETY

BACKGROUND OF THE INVENTION

Field of the Invention

The present invention relates in general to computing systems, and more particularly, to various embodiments for managing vehicles to enhance safety.

Description of the Related Art

Modern vehicles, such as automobiles, are often equipped with various safety devices that allow the driver to know when objects (e.g., people, animals, trees, etc.) are near the vehicle. For example, many automobiles are now equipped with "backup cameras" that allow the driver to easily monitor the area behind the vehicle when the vehicle is in reverse (or backing up) and/or have "proximity sensors" that alert the driver (e.g., via an aural indication) when the vehicle is within a predetermined distance of an object outside of the vehicle (e.g., a wall in a parking garage).

Although such systems or devices enhance vehicle safety, they are limited in that they only operate with respect to the "current" conditions of the vehicle when the vehicle is being operated. As a result, drivers are typically unaware of any events that may have occurred in the vicinity of the vehicle since the driver's last interaction with the vehicle (e.g., while the vehicle was parked), which may indicate potentially unsafe conditions.

SUMMARY OF THE INVENTION

Various embodiments for managing vehicles by one or more processors are described. In one embodiment, by way of example only, a method for managing vehicles, again by one or more processors, is provided. Deactivation of a vehicle is detected. While the vehicle is deactivated, an event indicative of a safety concern associated with the vehicle is detected. An indication of the event is caused to be provided to a user of the vehicle when the vehicle is reactivated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
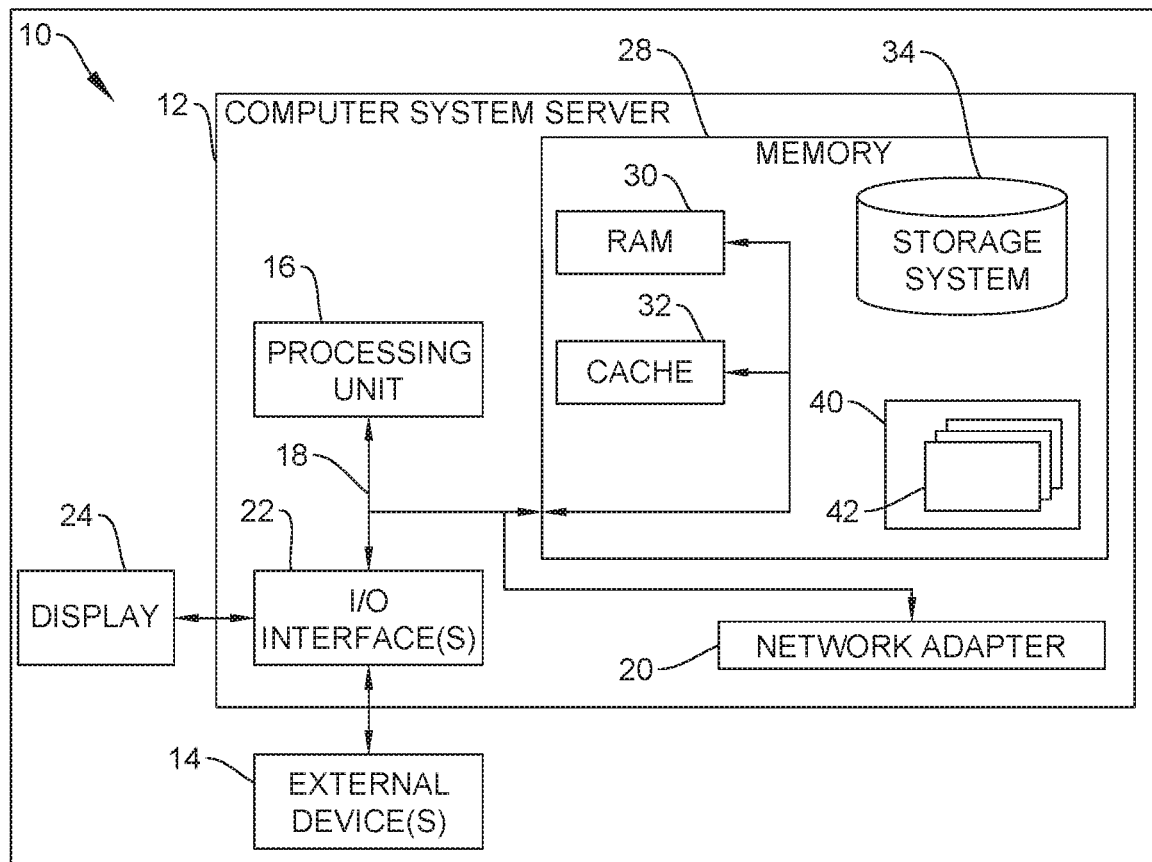
FIG. 1 is a block diagram depicting an exemplary computing node according to an embodiment of the present invention.

As discussed above, modern vehicles, such as automobiles, are often equipped with various safety devices that assist the driver in knowing when objects (e.g., people, animals, trees, etc.) are near the vehicle. For example, many automobiles are now equipped with "backup cameras" that allow the driver to easily monitor the area behind the vehicle when the vehicle is in reverse (or backing up) and/or have "proximity sensors" that alert the driver when the vehicle is within a predetermined distance of an object outside of the vehicle (e.g., a wall in a parking garage). As another example, some automobiles may be equipped with thermal (e.g., infrared) sensors that may be utilized to detect if a person or animal is under the car.

Although such systems or devices enhance vehicle safety, they are limited in that they only operate with respect to the "current" conditions of the vehicle when the vehicle is being operated. As a result, drivers are typically unaware of any events that may have occurred in the vicinity of the vehicle since the driver's last interaction with the vehicle (e.g., when the vehicle was parked), which may indicate potentially unsafe conditions.

As one example, consider a scenario in which after an automobile is parked (e.g., keyed-off, turned OFF, deactivated, etc.) and the driver has left the area, a young child plays near the vehicle. Even if the automobile is equipped with typical, modern safety enhancements, depending on, for example, the exact size and/or posture of the child or the exact position of the child relative to the automobile, conventional safety systems may not provide any warning when the driver returns to the vehicle (e.g., when the vehicle is keyed-on, turned ON, reactivated, etc.) that a person was recently near the vehicle and may not be able to detect that the child is still in the vicinity if that is the case.

Similarly, consider a scenario in which after an automobile is parked, an animal (e.g., a squirrel or cat) has climbed into the engine compartment of the vehicle (e.g., for warmth). In such an instance, even if equipped with typical, modern safety enhancements, the automobile is not monitoring for such activity when parked and would not provide any sort of indication to the driver of the potential safety concern when the driver returns to the vehicle. As such, there is a chance that the animal will be injured and/or the vehicle will be damaged.

As another example, consider a vehicle that is parked at night in a poorly lit area. Although many automobiles are equipped with alarms that are triggered when, for example, an event is detected that someone is attempting to break into and/or steal the automobile, the triggering events often have to be relatively severe (e.g., a window being broken, the car detecting a relatively strong force, etc.). As such, such systems do not monitor for more subtle types of activity which may indicate a safety issue to the driver (e.g., the presence of an unknown individual near the vehicle).

Generally, while the current systems and devices may be beneficial in assisting the driver in knowing when a potential safety concern has arisen when the vehicle is being operated, there are no systems currently available that monitor the vehicle and/or the area around the vehicle when the vehicle is not in use and alert the driver of any events or changes in conditions that may indicate potential safety concerns.

To address these needs, some embodiments described herein provide methods and systems for managing vehicles to, for example, enhance safety by monitoring the vehicle(s) when not in use or "deactivated." If an event, which is indicative of a potential safety concern, is detected during this time, a notification is provided to a user (e.g., the driver). In some embodiments, a potential safety concern may refer to the possibility that an object, person, or animal is near or in the vehicle when the vehicle is "(re)activated," as evidenced by detected changes in conditions associated with the vehicle while the vehicle is deactivated (e.g., parked).

As used herein, vehicle "deactivation" may refer to any event or process that is indicative of use of the vehicle being (at least temporarily) ceased, such as the vehicle being keyed-off, turned OFF, parked, the driver exiting the vehicle and/or leaving the vicinity of the vehicle, etc. However, vehicle deactivation may also occur when the vehicle is simply detected as being stopped for a short period of time (which may be configurable), such as when the vehicle is stopped at a traffic light and/or in "stop-and-go" traffic. Similarly, vehicle "activation" (or "reactivation") may refer to any event or process that is indicative of use of the vehicle being initiated (or reinitiated), such as the vehicle being keyed-on or turned ON (e.g., via a manual key switch or "smart key"), the driver entering the vehicle and/or sitting in the driver's seat, etc., or perhaps simply when pressure is applied to the gas pedal and/or when the brake pedal is released (e.g., after being at a traffic light and/or in stop-and-go traffic).

According to some embodiments described herein, various devices, such as computing systems/devices, sensors, etc., associated with (e.g., installed on/coupled to) the vehicle, perhaps in combination with external devices or external computing nodes, such as mobile electronic devices (e.g., mobile phones, tablet devices, PDAs, wearable technology devices, etc.) are monitored (or detected), such as when the vehicle is deactivated. As such, in some embodiments, the systems and methods described herein utilize an/the "internet of things" (IoT), as is commonly understood.

In some embodiments, when the vehicle is detected as being deactivated (e.g., parked, keyed-off, turned OFF, etc.), a baseline (or initial) set of conditions is determined using one or more of the available or utilized devices and/or sensors. If a change in the conditions is detected (e.g., exceeding a predetermined threshold level) while the vehicle is deactivated, a notification may be provided to the driver when the vehicle is detected as being reactivated (e.g., keyed-on, turned ON, etc.) via, for example, a display screen in the vehicle, a mobile device (e.g., the driver's mobile phone), an aural indication, etc.

For example, when the vehicle is parked and the driver has left the vicinity, an area around the vehicle (e.g., a "geo-fence") may be established and scanned for activity (e.g., via motion sensors, the presence of external computing nodes, etc.). If no activity is initially detected (e.g., no movement, no external computing nodes, etc.), such may be set as the baseline conditions. If certain activity is detected within the area (e.g., movement of an object/organism, the presence of a computing node, etc.) while the vehicle is parked, such may be detected as an event that indicates a potential safety concern. As a result, in some embodiments, when the vehicle is reactivated (e.g., keyed-on, etc.), a notification is generated and provided to the driver (or another user), such as a message on a display device in the vehicle, an aural indication, an electronic message (e.g., a text message), etc.

However, it should be noted that in some embodiments, a user may be provided with the ability to check on the status of the vehicle before he/she is in the vicinity of the vehicle. For example, the driver may send a request through an external computing node (e.g., an application on a mobile device, a website accessed through a mobile device or desktop, etc.), inquiring whether or not any events (e.g., triggering events) have been detected which may indicate a potential safety concern (e.g., whether or not an individual has tampered with and/or has been near the vehicle while the vehicle has been deactivated). In such embodiments, the sending of such an inquiry may be considered to be the reactivation of the vehicle. Further, in some embodiments, a notification may be provided to the user (e.g., the driver) in real-time (e.g., via an external computing node, such as a text message sent to a mobile phone) if the triggering event is relatively severe (e.g., one of the vehicle doors has been detected as being opened).

In some embodiments, depending on the detected event(s), user interaction with the vehicle may be required before the vehicle may be driven (e.g., power is prevented from being applied through the drivetrain (or powertrain) until the appropriate user interaction is detected). For example, the notification provided may include a request for an acknowledgment of the notification (e.g., pressing a button, a voice command, etc.). However, in some instances, the system may require user interaction specific to the detected event. For example, in a situation in which the system has determined that there is a chance an animal has climbed into the engine compartment, the driver may be required to manually open the hood, indicating that he/she has checked the engine compartment.

In some embodiments, the individual may be able to provide feedback to the system regarding, for example, the relevance or accuracy of the notifications or warnings. For example, the notification may include an inquiry regarding whether or not the perceived safety concern is/was in fact an issue. Using the feedback, the system may, over time, learn which events (or changes in conditions) should or should not be used as or considered "triggers" or "triggering events." In some embodiments, feedback may be essentially created from within the system. For example, if motion is detected within a predetermined distance of the rear of the vehicle using a motion sensor, and the presence of an object or individual is verified with a backup camera, the system may learn that such motion should be considered a valid triggering event, regardless of whether or not the backup camera detects the same activity in future occurrences. Further, the system may utilize collected data and/or detected events to predict dangerous situations. For example, if triggering events are frequently detected when the vehicle is parked at a particular location (e.g., as determined using a Global Positioning System (GPS) module) and/or at particular times (e.g., days of the week, times of the day, etc.), such data may be utilized to generate notifications even when no triggering events are explicitly detected.

Thus, in some embodiments, the methods and/or systems described herein utilize "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method for vehicle management by one or more processors is provided. Deactivation of a vehicle is detected. While the vehicle is deactivated, an event indicative of a safety concern associated with the vehicle (e.g., a triggering event) is detected. An indication of the event is caused to be provided to a user of the vehicle when the vehicle is reactivated.

The event may include detecting an object in a proximity of the vehicle. The event may include detecting motion of the object towards the vehicle and not detecting motion of the object away from the vehicle.

The detecting of the event may be performed with a sensor coupled to the vehicle. The sensor may include an electromagnetic sensor, such as a thermal sensor, a camera, or a combination thereof. The detecting of the event may include detecting the presence of a computing node not coupled to the vehicle.

The indication may include a request for user interaction with the vehicle. Power may be prevented from being delivered through the powertrain of the vehicle until the user interaction is detected.

Although the present disclosure repeatedly refers to "automobiles," it should be understood that the embodiments described herein may be applied to any type of vehicle, such as other types of land-based vehicles (e.g., motorcycles), as well as aircrafts and watercrafts.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, a display 24, etc.; one or more devices that enable a user to interact with computer system/server 12; and/or any devices (e.g., network card, modem, wireless transceiver, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, computing systems in vehicles, such as automobiles, aircraft, watercrafts, etc. and/or any sensors (e.g., motion detectors, cameras, etc.) included therein, personal computer systems, server computer systems, thin clients, thick clients, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
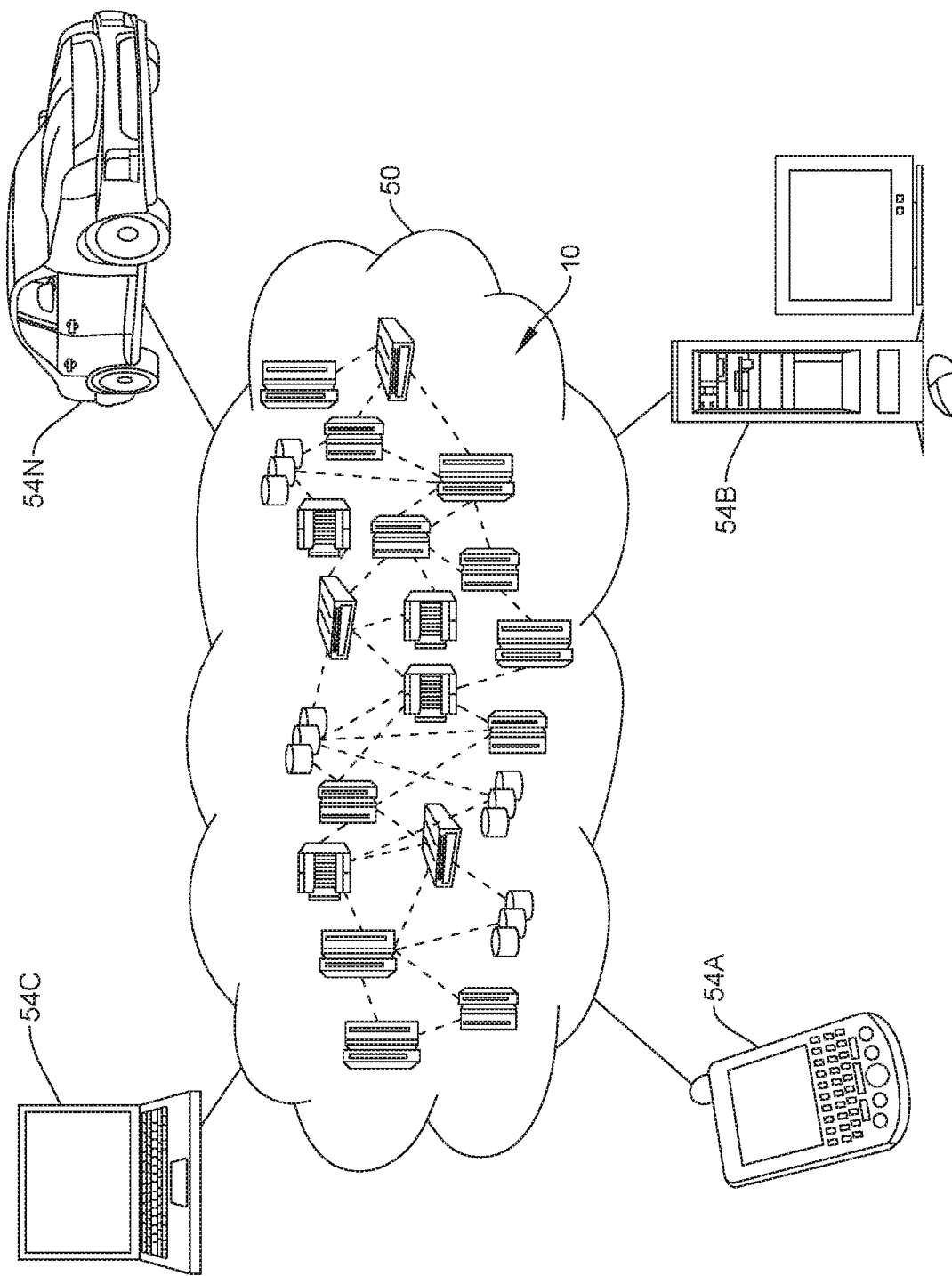
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
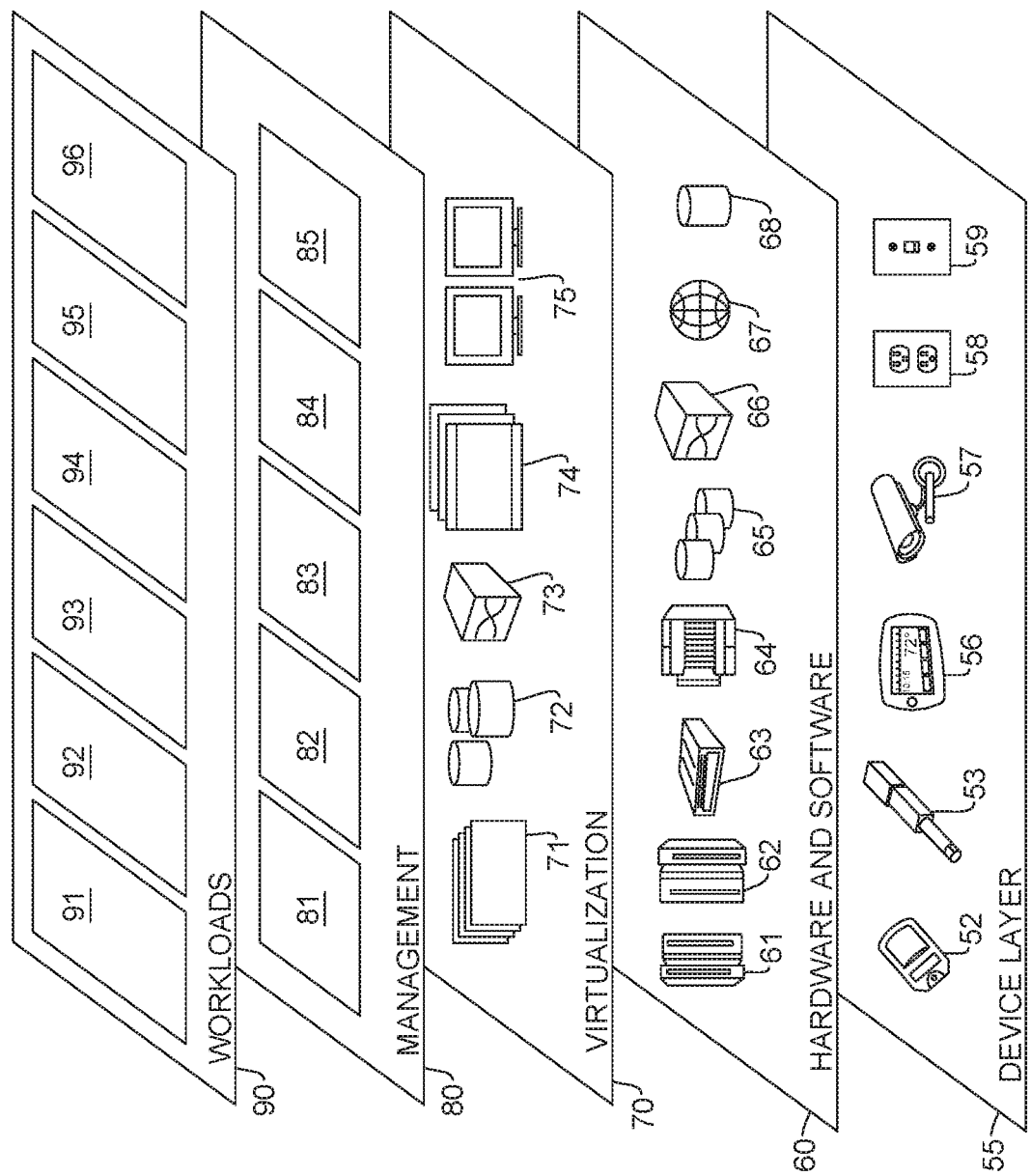
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, vehicular computing systems and sensors (e.g., motion sensors, thermal scanners, etc.), various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing vehicles as described herein. One of ordinary skill in the art will appreciate that the workloads and functions 96 for managing vehicles may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described above, in some embodiments, a vehicle (or multiple vehicles) is monitored with various devices, such as computing systems/devices, sensors, etc., associated with (e.g., installed on/coupled to) the vehicle, perhaps in combination with external devices, such as external computing nodes, such as mobile electronic devices (e.g., mobile phones, tablet devices, PDAs, wearable technology devices, smart clothing, etc.). In some embodiments, when the vehicle is detected as being deactivated (e.g., parked, keyed-off, turned OFF, etc.), a baseline (or initial) set of conditions (i.e., with respect to a safety status or condition of the vehicle) is determined using one or more of the available or utilized devices and/or sensors. If a change in the conditions is detected (e.g., exceeding a predetermined threshold level) while the vehicle is deactivated, a notification may be provided to the driver when the vehicle is detected as being (re)activated (e.g., keyed-on, turned ON, etc.) via, for example, a display screen in the vehicle, a mobile device (e.g., the driver's mobile phone), an aural indication, etc. In other words, if an event, which is indicative of a potential safety concern (e.g., a triggering event), is detected while the vehicle is deactivated, when the vehicle is reactivated, a notification is provided to the driver (or another user), alerting the driver of the potential issue.

Exemplary devices or systems (e.g., within a vehicle) that may be used to detect triggering events (e.g., establish baseline conditions and/or changes in the conditions) include, but are not limited to: motion (and/or proximity) detectors/sensors (thermal, ultrasonic, etc.), established geo-fences (e.g., with respect to the detection of external computing nodes/devices via wireless communication, such as mobile electric devices, wearable devices, radio-frequency identification (RFID) devices, etc.), thermal sensors/scanners, cameras (e.g., a back-up camera), thermometers (e.g., within the vehicle cabin and/or external), air quality sensors, vehicle controls (e.g., a brake pedal, a gear shift, door handles, etc.), moisture/water sensors, pressure/weight sensors (e.g., within vehicle seats), microphones, gyroscopes, accelerometers, chemical sensors (e.g., to detect odors, gases, and chemical signatures), etc. The various devices used may be considered to form and/or utilize an "internet of things" (IoT), as is commonly understood (e.g., a vehicular computing system combined with one or more sensors within the vehicle, perhaps combined with one or more external computing nodes).

With respect to the examples described above, motion detectors and geo-fences may be utilized to detect the presence and/or movement of objects near the vehicle. Regarding geo-fences, an external computing node (e.g., a mobile device, a wearable device, etc.) being detected (e.g., via wireless communications) within a predetermined distance of the vehicle may be indicative of the presence of an individual near the vehicle. In some embodiments, thermal sensors may be utilized to detect the presence of an organism (e.g., a person, an animal, etc.) near or in the vehicle (e.g., under the vehicle, in the engine compartment, etc.). Cameras may also be used to detect the presence and/or movement of objects (and/or organisms) near the vehicle. Internal thermometers, air quality sensors, and pressure/weight sensors (e.g., within the vehicle cabin) may be used to detect the potential presence of an individual (or animal) within the vehicle cabin. Vehicle controls may be monitored to determine whether or not an individual has interacted with the vehicle (e.g., one or more actuations of a door handle may indicate that someone has attempted to open a door). Microphones may be utilized to detect sounds that may be indicative of a safety concern. Gyroscopes and/or accelerometers may be utilized to detect movement of the vehicle (e.g., if the vehicle is bumped). As such, it should be understood that various types of data/sensors/occurrences besides detecting the presence and/or movement of an object near the vehicle may cause a triggering event to be detected. Other examples include vibration signals transmitted through the ground, characteristic frequency of human voices, computer vision/shape detection, chemical/odor signals from perfume, body odor, dirty diapers, etc.

It should be noted that readings from a single sensor/device type may be determined to be a triggering event. However, in some embodiments, readings from multiple sensors/devices may be used together. For example, if a motion/proximity sensor detects movement at the rear of the vehicle, a back-up camera may be utilized to verify the presence of a moving object at the rear of the vehicle. As such, it should be understood that a triggering event may be detected from a collection of data/evidence from multiple sensors/devices.

It should also be noted that various types of sensors/devices/systems may be utilized to determine movement of an object (e.g., a person) in the vicinity of the vehicle. For example, motion detectors may be used to, for example, determine that no movement (e.g., within a predetermined distance of the vehicle) is initially detected (i.e., as a baseline set of conditions), and then detect movement of an object (e.g., perhaps above a predetermined size) within a predetermined distance of the vehicle while the vehicle is deactivated. Such an event may be used as a triggering event as described herein, which may result in a notification being provided to the driver. However, a similar triggering event may be detected by the presence and/or movement of an external computing node near the vehicle (e.g., as detected via wireless communication).

However, with respect to the detection of moving objects (regardless of how that detection is made) in the vicinity of the vehicle, it should be understood that in some embodiments the detected movement may only be deemed a triggering event if the movement of the object is detected in a direction towards the vehicle, which is not followed by the detected movement of the object away from the vehicle. That is, an object (e.g., a person) being detected in the vicinity of the vehicle and moving towards the vehicle, and then detected as moving away from the vehicle may not be determined to be a triggering event in some embodiments (i.e., because the system has "tracked" the motion of the object away from the vehicle, which may indicate that the object poses no potential safety concern). Similarly, it should be understood that the various sensors/devices may be tuned so that any detected movement and/or presence of an object must be over a predetermined threshold (e.g., amount of movement or distance and/or size of the object) in order for a triggering event to be detected.

Figure 4:
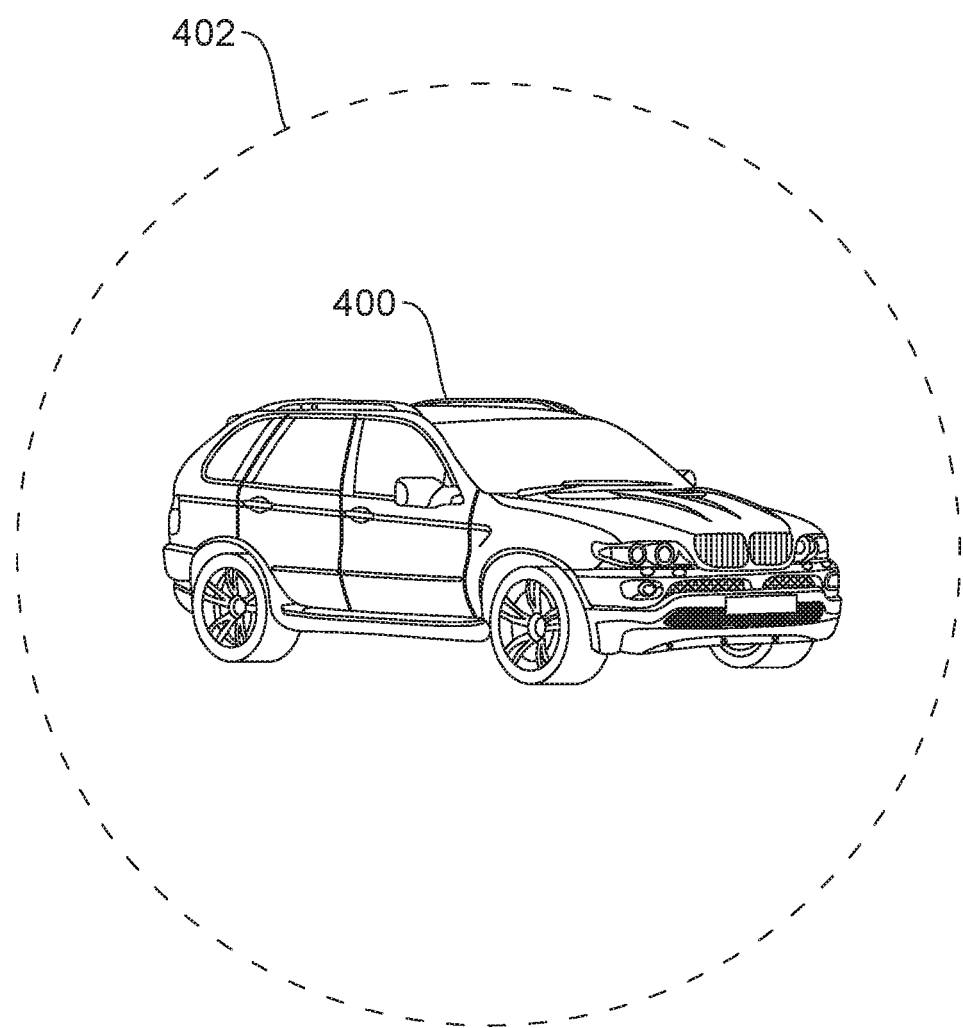
FIG. 4 is a simplified plan view of a vehicle and an area surrounding the vehicle.

FIG. 4 illustrates an exemplary vehicle 400 and an area 402 surrounding the vehicle 400, according to an embodiment of the present invention. Although the vehicle 400 depicted is an automobile, it should be understood that the embodiments described herein may be applied to other vehicles, such as aircrafts and watercrafts. It should be understood that in some embodiments the vehicle 400 as shown in FIG. 4 is deactivated (e.g., parked, keyed-off, turned OFF, etc.). That is, a driver of the vehicle 400 may have parked and exited the vehicle 400, and left the vicinity (e.g., the area 402).

The area 402 shown may indicate a range of various sensors, etc. and/or a geo-fence in which the detected presence of external computing nodes may be detected, as described above, which may be used to detect the presence and/or movement of an object near the vehicle 400 (e.g. when the vehicle is deactivated, parked, etc.), and in some cases, determined to be triggering events indicative of a potential safety concern. Although the area 402 is shown as having a circular shape, it should be understood that the area may have different shapes (e.g., rectangular, hour glass, etc.). Also, it should be understood that in some embodiments multiple ranges may be used (e.g., movement of an individual within 10 feet of the vehicle 400 may be detected, but will only be considered a concern if the movement is detected with 3 feet of the vehicle 400).

In some embodiments, after the vehicle 400 is detected as being deactivated (and perhaps after the driver/passengers have been detected as leaving the area 402), a baseline set of conditions is detected utilizing some, or all, of the available (or utilized) sensors/devices. For example, motion/proximity sensors on the vehicle 400 may be utilized to scan for any movement and/or objects with the area 402 (and/or within a particular distance of the vehicle 400), and one or more thermal scanners may be utilized to scan for thermal signatures (or "hits") below the vehicle. As shown in FIG. 4, the baseline set of conditions includes no substantial objects and/or movement (or any other activity) within the area 402. However, it should be understood that such may not always be the case. For example, if the vehicle 400 is parked in an active, crowded parking lot or near some foliage on a relatively windy day, the baseline set of conditions may include various movement/activity within the area 402.

Figure 5:
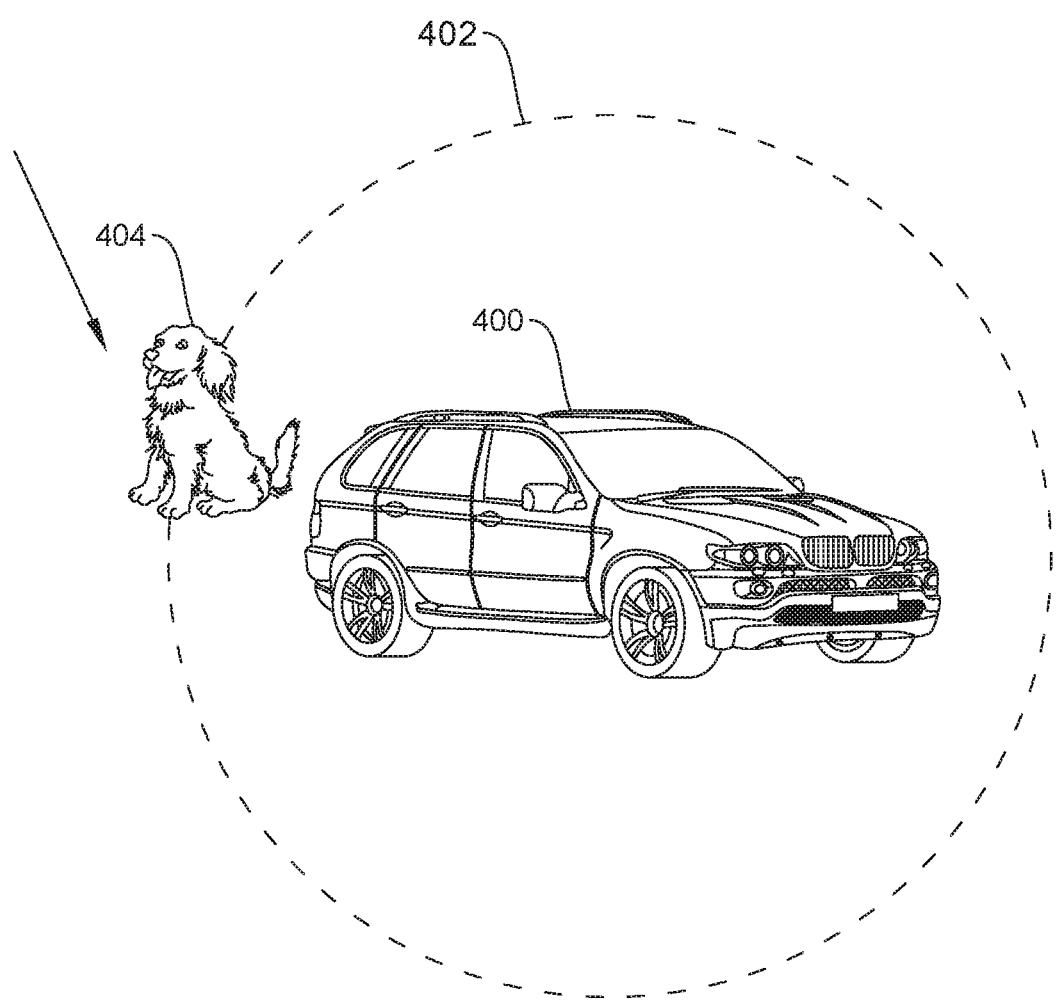
FIG. 5 is a simplified plan view of the vehicle of FIG. 4 illustrating an object moving towards the vehicle, within the area.

Referring now to FIG. 5, in the depicted embodiment, an object is detected as moving into area 402, near the back end of the vehicle 400. In the depicted embodiment, the object is a dog 404. However, it should be understood that other objects (e.g., people, inanimate objects, etc.) may be detected. It should also be understood that the detected presence and/or movement of an object near the vehicle 400 is intended as only an example of a potential triggering event as described herein. Still referring to FIG. 5, the presence and/or movement of the dog 404 may be detected using any suitable sensor/device on the vehicle 400, such as a thermal or ultrasonic motion detector or a backup camera. In some embodiments, the mere detection of the dog 404 within the area 402 may be determined to be a change in the conditions associated with the vehicle 400 sufficient to be considered a triggering event (i.e., raising a potential safety concern). As such, in some embodiments, when the vehicle 400 is activated or reactivated (e.g., keyed-on) by the driver, a notification may be generated and provided to the driver (e.g., on a display device in the vehicle 400, via the driver's mobile phone, etc.), alerting them of the potential safety concern (i.e., the possibility that an object/organism is still behind the vehicle 400).

Figure 6:
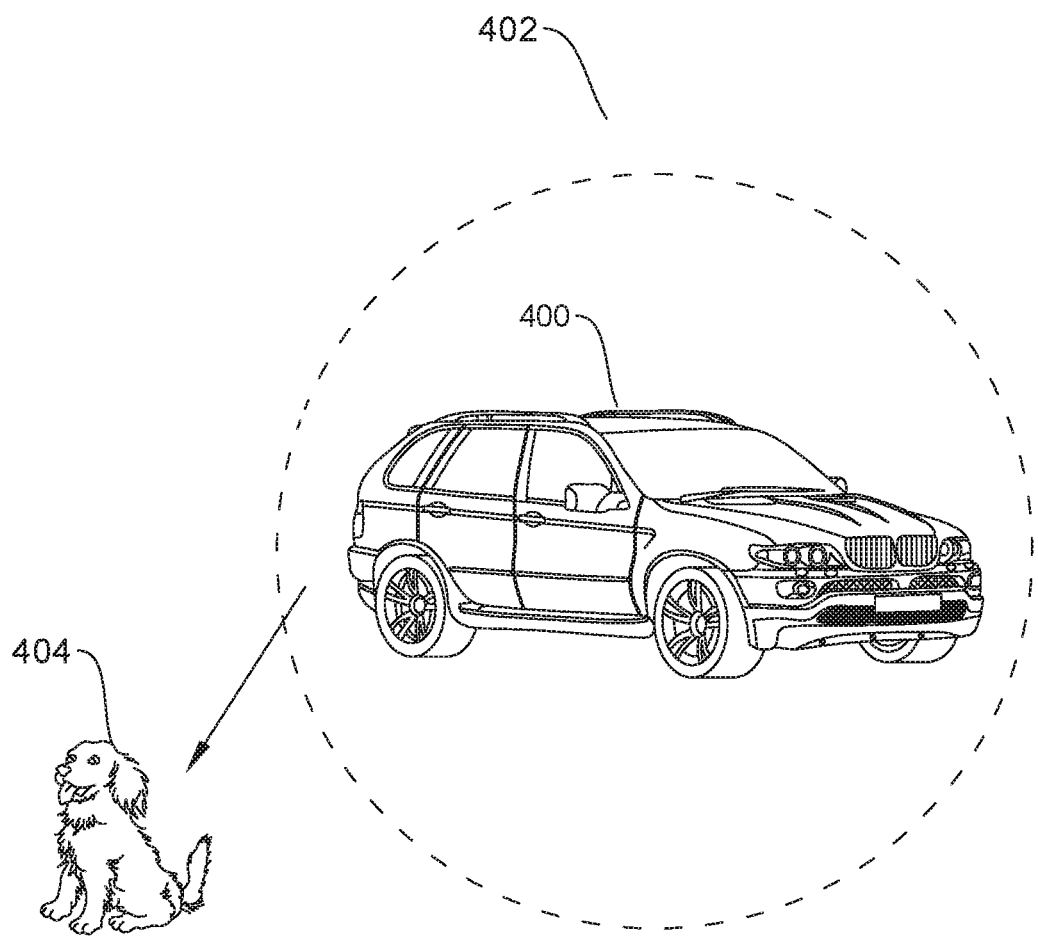
FIG. 6 is a simplified plan view of the vehicle of FIG. 5 illustrating the object moving away from the vehicle, out of the area.

However, referring now to FIG. 6, in the depicted embodiment, the dog 404 is detected as moving away from the vehicle 400, out of area 402 (e.g., via the same sensors/devices that detected the presence and movement of the dog 404 toward the vehicle 400). In some embodiments, such an event may indicate a reduced possibility of a safety concern and result in no triggering event being detected or determined. In other words, because the dog 404 was detected as moving away from the vehicle 400 (i.e., its motion towards and then away from the vehicle 400 was "tracked"), the system may determine that the detection of the movement of the dog 404 towards the vehicle 400 should not be considered a triggering event. In such an instance, in some embodiments, no notification may be provided to the driver. However, in some embodiments, a notification may be provided to the driver that indicates a lower level of safety concern compared to a situation in which the object (e.g., the dog 404) is only detected as moving towards the vehicle 400 (e.g., a "yellow" or "orange" notification compared to a "red" notification).

As described above, it should be noted that in some embodiments, the detection of a triggering event does not require the explicit detection of an object near the vehicle 400. Rather, the safety concern may be inferred from reading from sensors/systems that do not detect the presence or movement of an object relative to the vehicle (e.g., an increase in the temperature within the vehicle cabin, the actuation of a door handle, etc. may be a triggering event).

In some embodiments, when a triggering event is detected and a notification is provided to the driver (or another user), user interaction/input may be required before the vehicle 400 may be driven. For example, if the notification is provided via a display device within the vehicle, actuation of a button (e.g., a physical button or key or a portion of a touch screen device) may be requested, and the vehicle 400 may prevent power from being delivered through the powertrain (e.g., the vehicle may override any changes in the gearshift to keep the vehicle in "park") until such input is received. Also, in some situations, such as when the triggering event indicates the possibility that an animal has climbed into the engine compartment of the vehicle 400, the driver (or another user) may be required to perform an active safety inspection to check for the potential safety concern, such as opening the hood of the vehicle 400.

In some embodiments, the individual may be able to provide feedback to the system regarding, for example, the relevance or accuracy of the notifications. For example, the notification may include an inquiry regarding whether or not the perceived safety concern is/was in fact an issue. Using the feedback, the system may, over time, learn which events (or changes in conditions) should or should not be used as or considered triggering events. In some embodiments, feedback may be essentially created from within the system. For example, if motion is detected within a predetermined distance of the rear of the vehicle using a motion sensor, and the presence of an object or individual is verified with a backup camera, the system may learn that such motion should be considered a valid triggering event, regardless of whether or not the backup camera detects the same activity in future occurrences (e.g., in a poorly lit environment, if the camera is not working properly, etc.). Further, the system may utilize collected data and/or detected events to predict dangerous situations. For example, if triggering events are frequently detected when the vehicle is parked at a particular location and/or at particular times (e.g., days of the week, times of the day, etc.), such data may be utilized to generate notifications even when no triggering events are explicitly detected.

In some embodiments, the monitoring of the vehicle as described herein may be ceased based on, for example, the available power within the system (e.g., the vehicle's battery). For example, the monitoring may be ceased when the remaining charge/power of the vehicle's battery (e.g., the main battery or a battery dedicated to monitoring) falls below a predetermined threshold (e.g., 25% of maximum charge). Similarly, the monitoring may be ceased if the vehicle remains deactivated for a predetermined amount of time (e.g., several days, weeks, etc.). In such instances, a notification may be provided to the user of such, which perhaps includes a recommendation that a thorough inspection be performed before the vehicle is operated and/or that the battery charge is low.

Figure 7:
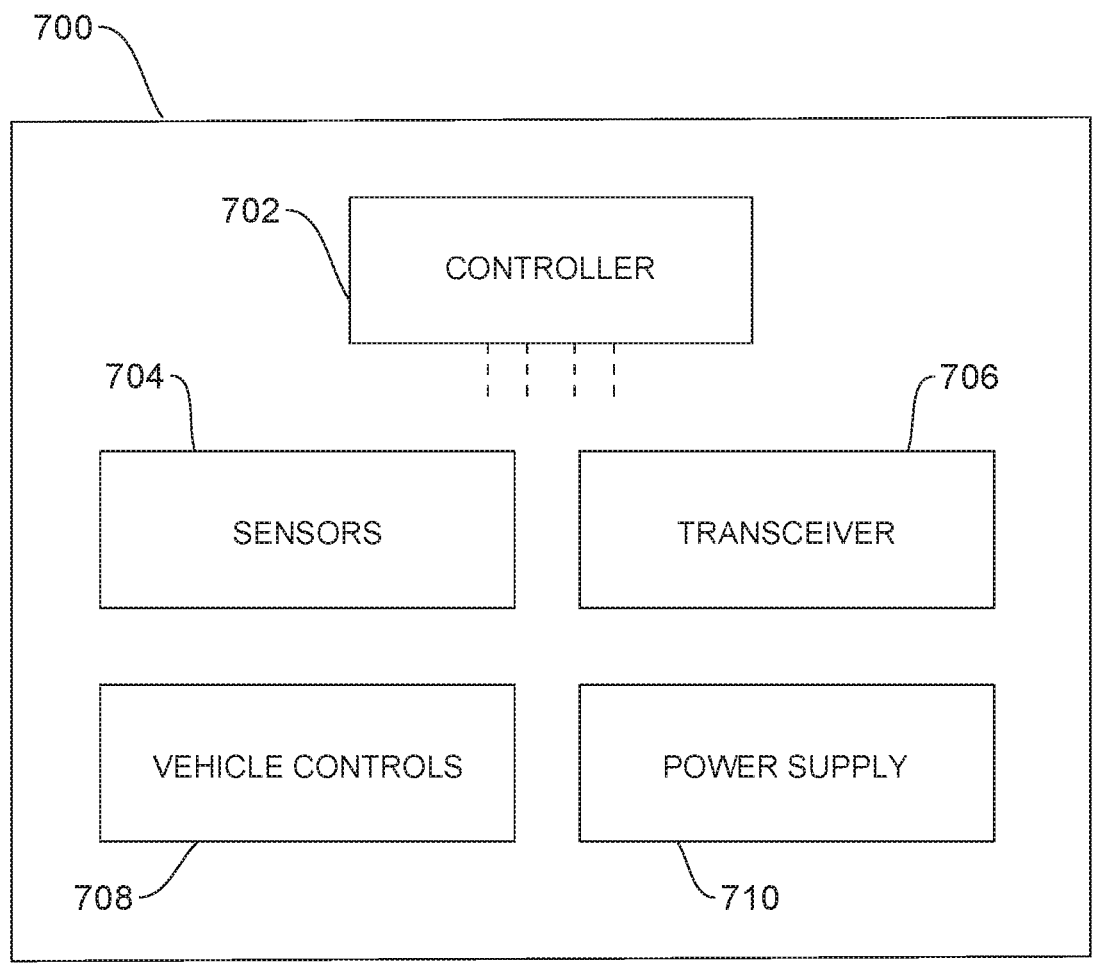
FIG. 7 is a simplified block diagram of a vehicular computing system according to an embodiment of the present invention.

FIG. 7 is a block diagram of a simplified vehicular system 700 according to some embodiments described herein. As shown, the system includes a controller 702, sensors 704, a transceiver 706, vehicle controls 708, and a power supply 710. The controller 702 may be any suitable processor or computing device (such as those described above) suitable for performing the functionality as described herein. The sensors 704 may include any of the vehicle sensors described herein, such as motion sensors, thermal scanners, cameras, thermometers, etc. The transceiver 706 may include any transmitter and receiver suitable for wireless communications (e.g., Wi-Fi), including detecting the presence and/or movement of computing nodes (e.g., mobile devices) and/or communicating with the computing nodes. The vehicle controls 708 may include any devices within and/or on the vehicle that are used to control the various functionalities of the vehicle, such as a steering wheel, gearshift, pedals (gas pedal, brake pedal, etc.), door handles, window controls, radio controls, etc. As described above, the vehicle controls 708 may be monitored by the methods and systems described herein. The power supply 710 may include any source of electrical power suitable for powering the controller 702, the sensors 704, the transceiver 706, the vehicle controls 708, and/or any other devices or systems with the vehicle.

Figure 8:
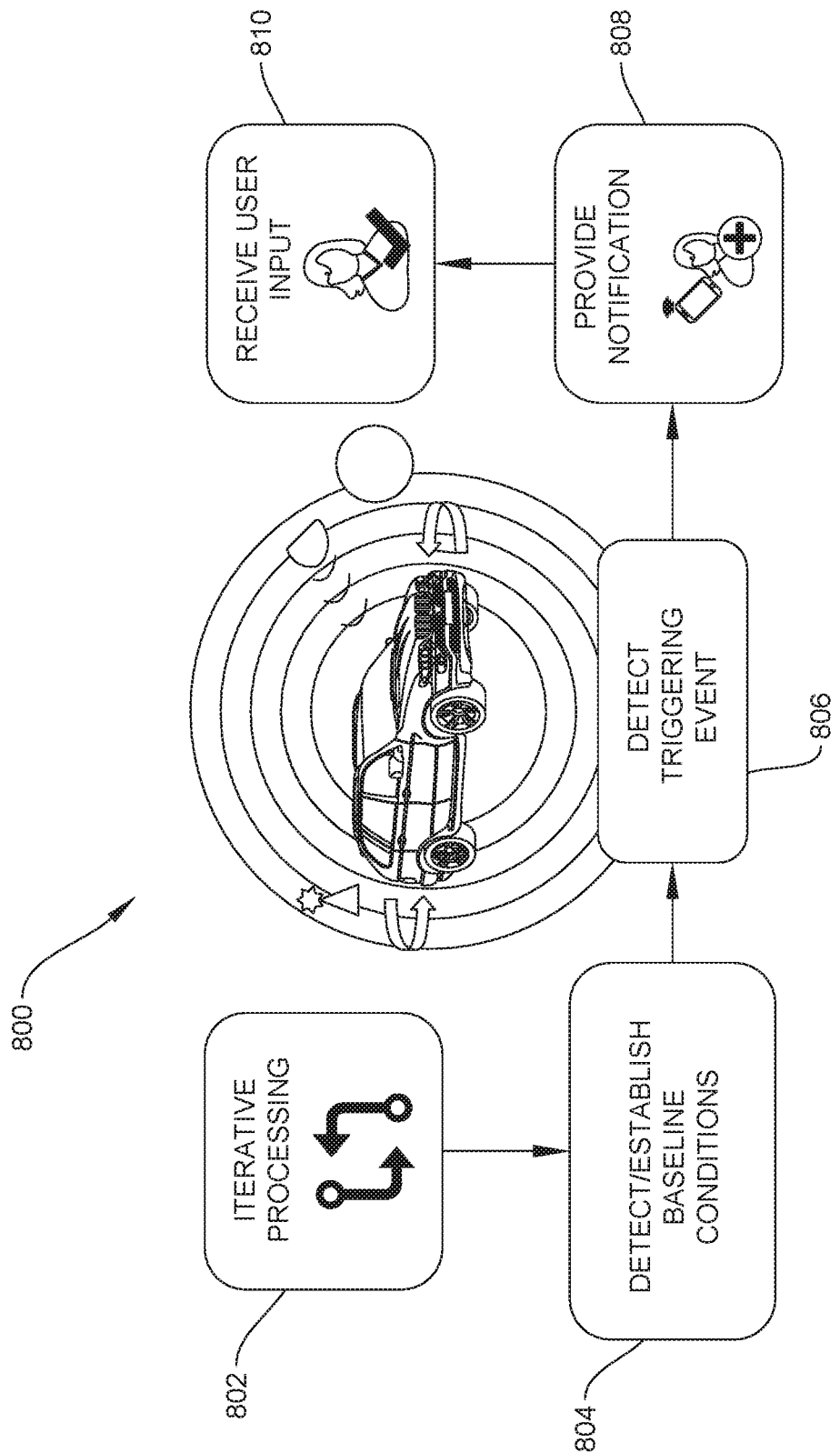
FIG. 8 is a flowchart/block diagram of a method for managing vehicles according to an embodiment of the present invention.

FIG. 8 illustrates a flowchart/block diagram of a method 800 for managing vehicles according to some embodiments described herein. At block 802, iterative processing is performed. In particular, in some embodiments, the iterative processing performed at block 802 includes cognitive analysis, machine learning, etc. of previous cycles of the method 800. That is, previous baseline conditions, detected triggering events, and user input/feedback may be processed to improve the efficiency and/or effectiveness of the method 800, as described above. At block 804, after the vehicle is deactivated (e.g., parked), baseline conditions are detected and/or established as described above. At block 806, a triggering event (or a change in the conditions associated with the vehicle which may indicate a potential safety concern) is detected. At block 808, a notification is provided to the user (e.g., the driver of the vehicle), such as when the vehicle is reactivated (e.g., keyed-on, the driver sits in the driver's seat, etc.). At block 810, in some embodiments, user input is received (e.g., the user performs an interaction to "clear" the safety alert, the user provides feedback regarding the safety concern, etc.).

Figure 9:
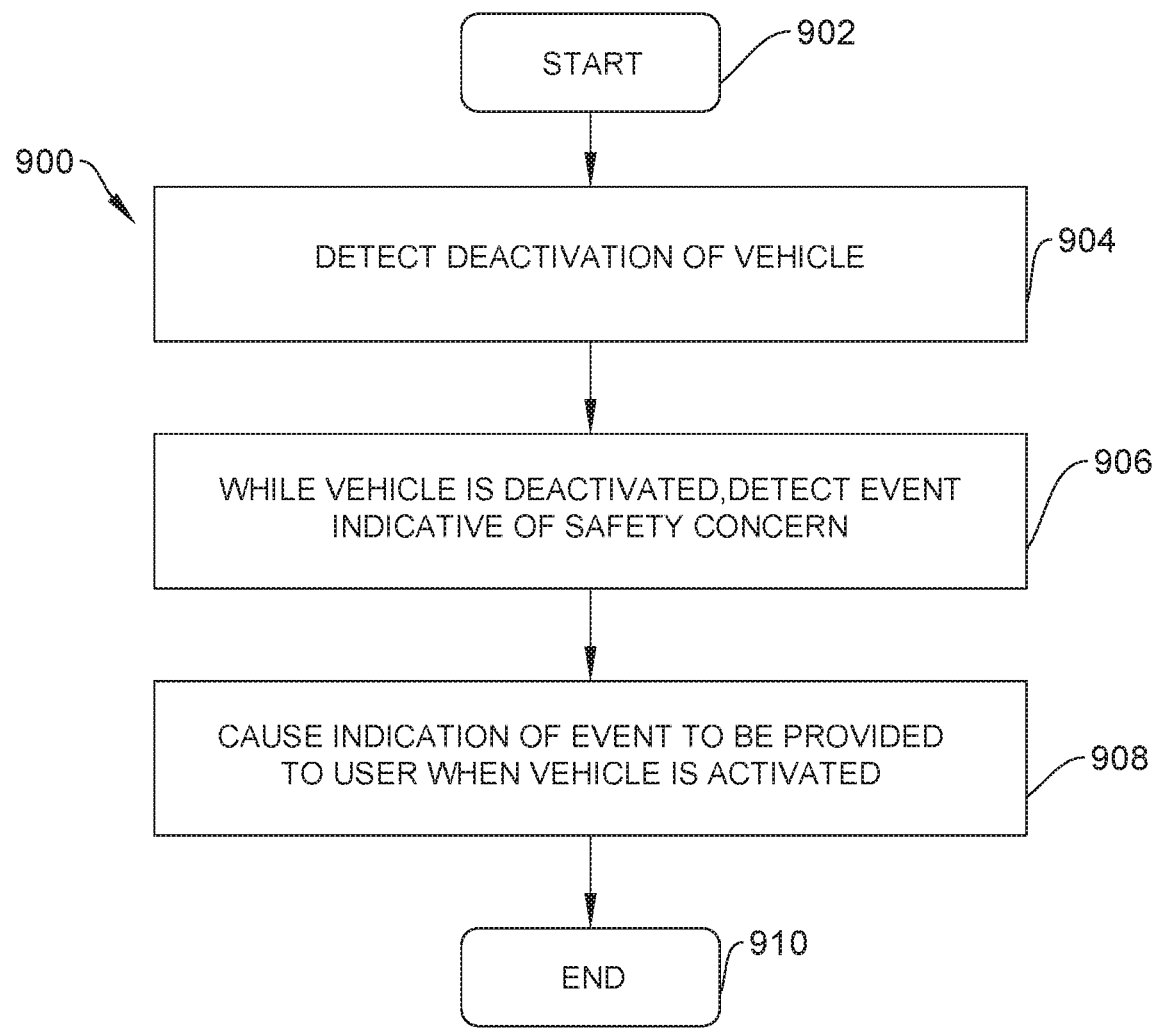
FIG. 9 is a flowchart diagram of an exemplary method for managing vehicles according to an embodiment of the present invention.

Turning to FIG. 9, a flowchart diagram of an exemplary method 900 for managing vehicles, in accordance with various aspects of the present invention, is provided. Method 900 begins (step 902) with, for example, a vehicle being operated. In some embodiments, the vehicle is an automobile, but in other embodiments, the vehicle may be other types of vehicles, such as aircrafts and watercrafts.

Deactivation of the vehicle is detected (step 904). In embodiments in which the vehicle is an automobile, the deactivation of the vehicle may include the vehicle being keyed-off, turned OFF, parked, etc., as is commonly understood. In some embodiments, the detecting of the deactivation of the vehicle may include determining that an operator (or driver) of the vehicle has left the vicinity of the vehicle and/or establishing a baseline set of conditions regarding the vehicle and/or the surroundings of the vehicle.

While the vehicle is deactivated, an event indicative of a safety concern associated with the vehicle (or a triggering event) is detected (step 906). As described above, the event may include the detection of activity that suggests the presence and/or movement of an object, person, or animal near (e.g., within a proximity of, in, under, etc.) the vehicle and/or that the object, person, or animal has not left the vicinity of the vehicle. The event may include detecting motion of the object towards the vehicle and not detecting motion of the object away from the vehicle. The detecting of such an event may be performed using any suitable sensor or device, including those installed on (or coupled to) the vehicle (e.g., an electromagnetic sensor, such as a thermal sensor, a camera, or a combination thereof), as well as external devices, such as computing nodes (e.g., detecting the presence of a computing node not coupled to the vehicle).

An indication of the event is caused to be provided to a user of the vehicle when the vehicle is (re)activated (step 908). The reactivation of the vehicle may include the vehicle being keyed-on, turned ON, the driver sitting in the driver's seat, etc. As described above, the indication may be provided to the user via, for example, a display device within the vehicle or through an external computing device (e.g., text, email, etc. via mobile phone, tablet, etc.). The indication may include a request for user interaction with the vehicle. Power may be prevented from being delivered through the powertrain of the vehicle until the user interaction is detected.

Method 900 ends (step 910) with, for example, the user interaction being detected and/or the user providing feedback regarding the relevance or accuracy of the notifications or warnings. As described above, using the feedback, the system may, over time, learn which events (or changes in conditions) should or should not be used as or considered triggering events.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for vehicle management comprising:
    detecting deactivation of a vehicle;
    subsequent to detecting the deactivation and while the vehicle is deactivated, detecting an event indicative of a safety concern associated with the vehicle; wherein the vehicle is stopped prior to and during the detection of the event;
    causing an indication of the event to be provided to a user of the vehicle when the vehicle is reactivated; wherein the indication includes a request for user interaction with the vehicle acknowledging the detected event; and
    preventing power from being delivered through the powertrain of the vehicle until the user interaction is detected such that the user is required to acknowledge the event prior to allowing the power to be delivered through the powertrain of the vehicle.

2. The method of claim 1, wherein the event includes detecting an object in a proximity of the vehicle.

3. The method of claim 2, wherein the event includes detecting motion of the object towards the vehicle and not detecting motion of the object away from the vehicle.

4. The method of claim 1, wherein the detecting of the event is performed with a sensor coupled to the vehicle.

5. The method of claim 1, wherein the sensor includes an electromagnetic sensor, and wherein the electromagnetic sensor includes a thermal sensor, a camera, or a combination thereof.

6. The method of claim 1, wherein the detecting of the event includes detecting the presence of a computing node not coupled to the vehicle.

7. A system for vehicle management comprising:
    at least one processor that
        detects deactivation of a vehicle;
        subsequent to detecting the deactivation and while the vehicle is deactivated, detects an event indicative of a safety concern associated with the vehicle; wherein the vehicle is stopped prior to and during the detection of the event;
        causes an indication of the event to be provided to a user of the vehicle when the vehicle is reactivated; wherein the indication includes a request for user interaction with the vehicle acknowledging the detected event; and
        prevents power from being delivered through the powertrain of the vehicle until the user interaction is detected such that the user is required to acknowledge the event prior to allowing the power to be delivered through the powertrain of the vehicle.

8. The system of claim 7, wherein the event includes detecting an object in a proximity of the vehicle.

9. The system of claim 8, wherein the event includes detecting motion of the object towards the vehicle and not detecting motion of the object away from the vehicle.

10. The system of claim 7, wherein the detecting of the event is performed with a sensor coupled to the vehicle.

11. The system of claim 7, wherein the sensor includes an electromagnetic sensor, and wherein the electromagnetic sensor includes a thermal sensor, a camera, or a combination thereof.

12. The system of claim 7, wherein the detecting of the event includes detecting the presence of a computing node not coupled to the vehicle.

13. A computer program product for vehicle management by one or more processors, the computer program product comprising a non-transitory computer-readable storage medium having computer-readable program code portions stored therein, the computer-readable program code portions comprising:
- an executable portion that detects deactivation of a vehicle;
- an executable portion that, subsequent to detecting the deactivation and while the vehicle is deactivated, detects an event indicative of a safety concern associated with the vehicle; wherein the vehicle is stopped prior to and during the detection of the event;
- an executable portion that causes an indication of the event to be provided to a user of the vehicle when the vehicle is reactivated; wherein the indication includes a request for user interaction with the vehicle acknowledging the detected event; and
- an executable portion that prevents power from being delivered through the powertrain of the vehicle until the user interaction is detected such that the user is required to acknowledge the event prior to allowing the power to be delivered through the powertrain of the vehicle.

14. The computer program product of claim 13, wherein the event includes detecting an object in a proximity of the vehicle.

15. The computer program product of claim 14, wherein the event includes detecting motion of the object towards the vehicle and not detecting motion of the object away from the vehicle.

16. The computer program product of claim 13, wherein the detecting of the event is performed with a sensor coupled to the vehicle.

17. The computer program product of claim 13, wherein the sensor includes an electromagnetic sensor, and wherein the electromagnetic sensor includes a thermal sensor, a camera, or a combination thereof.

18. The computer program product of claim 13, wherein the detecting of the event includes detecting the presence of a computing node not coupled to the vehicle.

* * * * *